United States Patent
Koonankeil (10) Patent No.: US 12,098,650 B1
(45) Date of Patent: Sep. 24, 2024

(54) METHOD OF DETERMINING LOCATION AND ORIENTATION OF AN INTERNAL CORE CAVITY

(71) Applicant: RTX Corporation, Farmington, CT (US)

(72) Inventor: James M. Koonankeil, Marlborough, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/237,918

(22) Filed: Aug. 25, 2023

(51) Int. Cl.
*F01D 25/28* (2006.01)
*B23P 15/02* (2006.01)

(52) U.S. Cl.
CPC .............. *F01D 25/28* (2013.01); *B23P 15/02* (2013.01); *B23P 2700/06* (2013.01)

(58) Field of Classification Search
CPC ....... F01D 25/28; B23P 15/02; B23P 2700/06
See application file for complete search history.

(56) References Cited

U.S. PATENT DOCUMENTS

| | | | |
|---|---|---|---|
| 7,296,615 B2 | 11/2007 | Devine, II et al. | |
| 10,294,798 B2 | 5/2019 | Propheter-Hinckley et al. | |
| 2007/0059171 A1 | 3/2007 | Simms et al. | |
| 2008/0005903 A1 | 1/2008 | Trindade et al. | |
| 2022/0242071 A1* | 8/2022 | Salimi | G01B 11/27 |

* cited by examiner

*Primary Examiner* — Rick K Chang
(74) *Attorney, Agent, or Firm* — Bachman & LaPointe, P.C.

(57) ABSTRACT

A process of determining a location of a core cavity in a cast part including determining a nominal location of the cavity within the part; determining a nominal location of at least one locator hole in at least one external surface of the part; determining an actual location of the at least one locator hole in the at least one external surface of the part; comparing the nominal location of the at least one locator hole in the at least one external surface of the part to the actual location of the at least one locator hole in the at least one external surface of the part; and determining an actual location of the core cavity within the part.

20 Claims, 7 Drawing Sheets

METHOD OF DETERMINING LOCATION AND ORIENTATION OF AN INTERNAL CORE CAVITY

BACKGROUND

The present disclosure is directed to the improved process of determining a location and an orientation of an internal core cavity for a casting.

Gas turbine engines have numerous hollow structures that utilize film holes to create a boundary layer adjacent to the structure to lower the temperature of the structure. Example turbine engine structures include rotor blades, guide vanes, stator vanes, and blade outer air seals.

The hollow structures can be cast using cores that are supported within molds. The cores are typically supported by pin-like locator devices, such as conical locator, rod locator and pin locator, that leave locating holes extending from an exterior surface of the structure through a wall to the passage formed by the core once the core and locator pin are removed.

The hollow structure typically undergoes machining operations subsequent to casting. Determining the location of the passages and other heat transfer features within the hollow structure accurately is desirable.

Drilling of cooling holes in cooled turbine airfoils is challenging due to core shift associated with the casting process. The shifting of the cores results in variation in the location and orientation of the internal cavity. When drilling the cooling holes the reference for location of the cooling holes is based on the primary datum structure established by the external airfoil surface. Shifting of the internal cavity results in cooling hole blockages and other related defects due to variation in cavity location and/or cavity wall thickness.

What is needed is a process to accurately determine location and orientation of the internal passages and other heat transfer features.

SUMMARY

In accordance with the present disclosure, there is provided a process of determining a location and orientation of a core cavity in a cast part comprising determining a nominal location and orientation of the core cavity within the part; determining a nominal location of at least one locator hole in at least one external surface of the part; determining an actual location of the at least one locator hole in the at least one external surface of the part; comparing the nominal location of the at least one locator hole in the at least one external surface of the part to the actual location of the at least one locator hole in the at least one external surface of the part; and determining an actual location and orientation of the core cavity within the part.

A further embodiment of any of the foregoing embodiments may additionally and/or alternatively include the process further comprising determining a nominal location of a first locator hole in a first external surface of the part, the first locator hole being formed responsive to a first locator positioned between a core and the first external surface; determining an actual location of the first locator hole in the first external surface of the part, the first locator hole being formed responsive to removal of the first locator; and comparing the nominal location of the first locator hole in the first external surface to the actual location of the first locator hole in the first external surface.

A further embodiment of any of the foregoing embodiments may additionally and/or alternatively include the process further comprising determining a nominal first wall thickness between the core and the first exterior surface; and determining an actual first wall thickness between the core cavity and the first exterior surface.

A further embodiment of any of the foregoing embodiments may additionally and/or alternatively include the process further comprising determining a nominal location of a second locator hole in a second external surface of the part, the second locator hole being formed responsive to a second locator positioned between a core and the second external surface; determining an actual location of the second locator hole in the second external surface of the part, the second locator hole being formed responsive to removal of the second locator; and comparing the nominal location of the second locator hole in the second external surface to the actual location of the second locator hole in the second external surface.

A further embodiment of any of the foregoing embodiments may additionally and/or alternatively include the process further comprising determining a nominal second wall thickness between the core and the second exterior surface; and determining an actual second wall thickness between the core cavity and the second exterior surface.

A further embodiment of any of the foregoing embodiments may additionally and/or alternatively include the process further comprising determining a nominal location of a third locator hole in a third external surface of the part, the third locator hole being formed responsive to a third locator positioned between a core and the third external surface; determining an actual location of the third locator hole in the third external surface of the part, the third locator hole being formed responsive to removal of the third locator; and comparing the nominal location of the third locator hole in the third external surface to the actual location of the third locator hole in the third external surface.

A further embodiment of any of the foregoing embodiments may additionally and/or alternatively include the process further comprising determining a nominal third wall thickness between the core and the third exterior surface; and determining an actual third wall thickness between the core cavity and the third exterior surface.

In accordance with the present disclosure, there is provided a process of determining a location and orientation of a cavity in a cast part for a gas turbine engine comprising determining a nominal location and orientation of the cavity within the part responsive to a nominal location of a core configured to form the cavity; determining a nominal location of at least one locator hole in at least one external surface of the part; determining an actual location of at least one locator hole responsive to removal of the at least one locator in the at least one external surface of the part; comparing the nominal location of the at least one locator hole in the at least one external surface of the part to the actual location of the at least one locator hole in the at least one external surface of the part; and determining an actual location and orientation of the cavity within the part.

A further embodiment of any of the foregoing embodiments may additionally and/or alternatively include comparing the nominal location of the at least one locator hole in the at least one external surface of the part to the actual location of the at least one locator hole in the at least one external surface of the part further comprises determining a distance between the nominal location of the at least one locator hole and the actual location of the at least one locator hole.

A further embodiment of any of the foregoing embodiments may additionally and/or alternatively include the process further comprising determining a nominal first wall thickness between the core and the first exterior surface; and determining an actual first wall thickness between the cavity and the first exterior surface.

A further embodiment of any of the foregoing embodiments may additionally and/or alternatively include the process further comprising comparing the nominal first wall thickness to the actual first wall thickness.

A further embodiment of any of the foregoing embodiments may additionally and/or alternatively include the process further comprising determining multiple nominal first wall thicknesses between the core and the first exterior surface; determining multiple actual first wall thicknesses between the cavity and the first exterior surface; comparing the multiple nominal first wall thicknesses to the multiple actual first wall thicknesses; and identifying any differences between the multiple nominal first wall thicknesses to the multiple actual first wall thicknesses.

A further embodiment of any of the foregoing embodiments may additionally and/or alternatively include the part is selected from the group consisting of a rotor blade, a guide vane, a stator vanes and a blade outer air seal.

In accordance with the present disclosure, there is provided a process of determining a location and orientation of a cavity in a cast part for a gas turbine engine comprising: determining a nominal location and orientation of a core configured to form the cavity; determining a nominal location of at least one locator in at least one external surface of the part; determining an actual location of at least one locator hole responsive to removal of the at least one locator in the at least one external surface of the part; comparing the nominal location of the at least one locator in the at least one external surface of the part to the actual location of the at least one locator hole in the at least one external surface of the part; determining an actual location of the cavity within the part; and determining an actual orientation of the cavity within the part.

A further embodiment of any of the foregoing embodiments may additionally and/or alternatively include the process further comprising determining a nominal location of a first locator hole in a first external surface of the part, the first locator hole being formed responsive to the first locator positioned between the core and the first external surface; determining an actual location of the first locator hole in the first external surface of the part, the first locator hole being formed responsive to removal of the first locator; and comparing the nominal location of the first locator hole in the first external surface to the actual location of the first locator hole in the first external surface.

A further embodiment of any of the foregoing embodiments may additionally and/or alternatively include the further comprising determining a nominal first wall thickness between the core and the first exterior surface; and determining an actual first wall thickness between the cavity and the first exterior surface.

A further embodiment of any of the foregoing embodiments may additionally and/or alternatively include the process further comprising determining a nominal location of a second locator hole in a second external surface of the part, the second locator hole being formed responsive to a second locator positioned between the core and the second external surface; determining an actual location of the second locator hole in the second external surface of the part, the second locator hole being formed responsive to removal of the second locator; and comparing the nominal location of the second locator hole in the second external surface to the actual location of the second locator hole in the second external surface.

A further embodiment of any of the foregoing embodiments may additionally and/or alternatively include the process further comprising determining a nominal second wall thickness between the core and the second exterior surface; and determining an actual second wall thickness between the cavity and the second exterior surface.

A further embodiment of any of the foregoing embodiments may additionally and/or alternatively include the process further comprising determining a nominal location of a third locator hole in a third external surface of the part, the third locator hole being formed responsive to a third locator positioned between the core and the third external surface; determining an actual location of the third locator hole in a third external surface of the part, the third locator hole being formed responsive to removal of the third locator; and comparing the nominal location of the third locator hole in the third external surface to the actual location of the third locator hole in the third external surface.

A further embodiment of any of the foregoing embodiments may additionally and/or alternatively include the process further comprising determining a nominal third wall thickness between the core and the third exterior surface; and determining an actual third wall thickness between the cavity and the third exterior surface.

US Publication 2008/0005903A1 incorporated by reference herein, discloses a method for locating the internal cavity by use of features visible from the exterior surface. The present disclosure improves upon the publication by enhancing the capability to not only determine cavity location, but also provide information related to determination of the orientation of the internal cavity such that parameters like wall thickness, backwall distance, and sidewall clearance can also be considered when defining the hole drilling targeting.

The referenced disclosure (US Pub. 2008/0005903A1) provides a method to identify a location of hidden cavities in a turbine airfoil. The current disclosure includes an improvement by additionally allowing for determination of cavity orientation. By describing both the location and orientation of the internal cavity information critical to drilling of the cooling holes more precisely such as wall thickness, rib location, etc. can be determined.

The current disclosure is similar to the reference (US Pub. 2008/0005903A1) in that locator pins are utilized to create holes that provide information on the precise location of internal cavities. The improvement includes that the holes are installed in multiple locations that are relative to each other and in multiple axes such that the change in relative position of each feature will provide information to quantify rotational and translational deviations of the internal cavity. Once the rotational and translational location and orientation of the internal cavity is determined additional information such as wall thickness can be determined.

Other details of the process of determining a location and an orientation of an internal core cavity for a casting are set forth in the following detailed description and the accompanying drawings wherein like reference numerals depict like elements.

DETAILED DESCRIPTION

Figure 1:
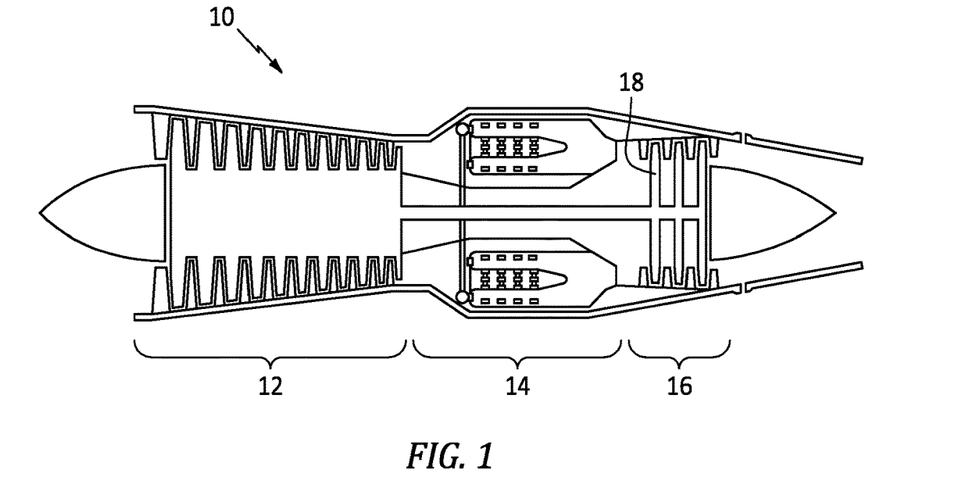
FIG. 1 is a schematic representation of an exemplary turbine engine.
Figure 2:
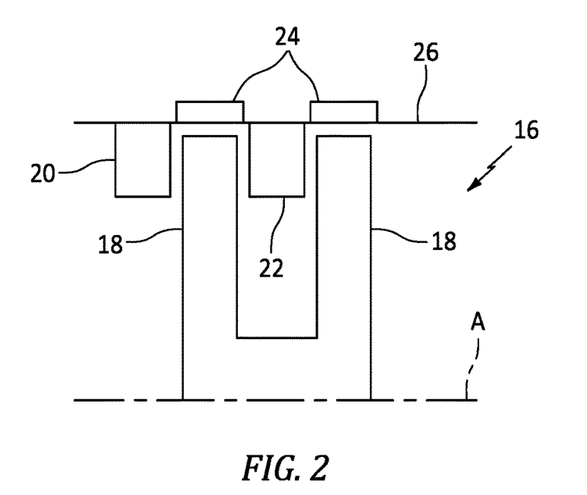
FIG. 2 is an enlarged schematic representation of a turbine section of the turbine engine of FIG. 1.

A gas turbine engine 10 is schematically shown in FIG. 1. The turbine engine 10 includes a compressor section 12, a combustor section 14, and a turbine section 16. The example turbine engine structure is illustrated as a rotor blade 18 in the example shown in FIG. 4-5B. However, it should be understood that the turbine engine structure can be any rotating or fixed component from a turbine section 16 or any other portion of a turbine engine. A turbine engine section 16 is schematically shown in FIG. 2. The turbine section 16 includes rotating structure such as rotor blades 18. The turbine section 16 also includes fixed structure such as guide and stator vanes 20, 22 and blade outer air seals 24 arranged on a case 26. These structures are well known in the art and typically include passages for providing a cooling fluid to film holes on an exterior of the structure.

Figure 3:
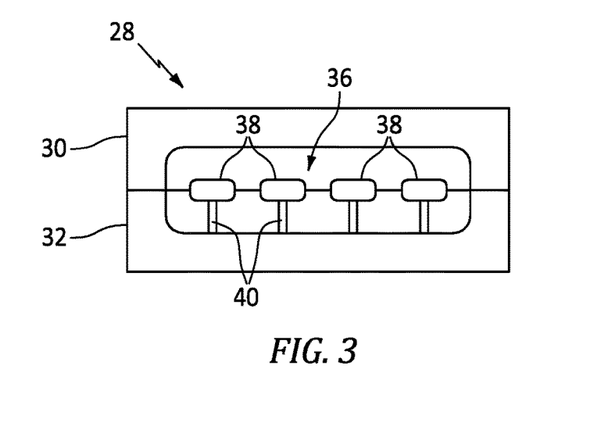
FIG. 3 is a schematic representation of a mold and cores used to cast a turbine engine structure.

Hollow turbine engine structures are typically formed using a mold 28 having two or more portions, as schematically depicted in FIG. 3. The mold 28 includes first and second portions 30, 32 providing a cavity 36. One or more cores 38 are supported by locator pins 40 so that walls can be cast about the cores 38. The cores 38 can be, for example, refractory metal cores or ceramic cores. The locator pins 40 can be provided by a separate material such as a quartz rod or wax die or by protrusions provided by the parent core material, for example. The location and number of locator pins 40 are determined so as to minimize the number of locator pins used. The cores 38 and locator pins 40 are removed, as is known in the art, to provide cooling passages in the space occupied by the cores. The openings left by the locator pins 40 in the prior art structures were undesired and typically resulted in parasitic cooling air outlets.

Figure 4:
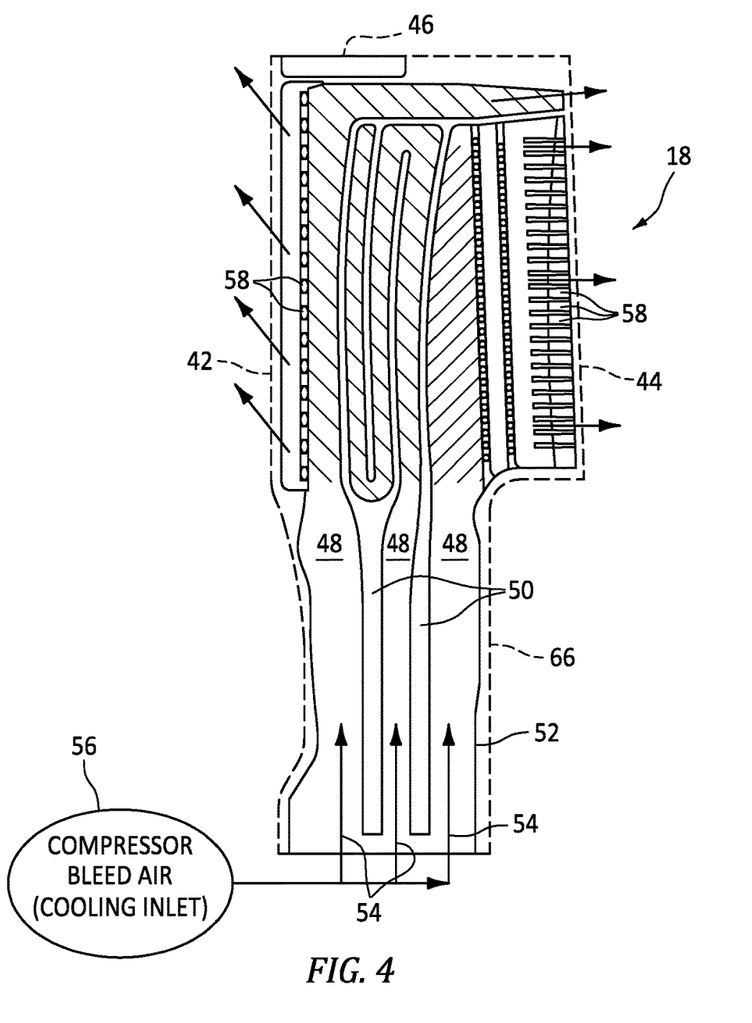
FIG. 4 is a cross-sectional schematic representation of the cores for an example rotor blade.

The turbine rotor blade 18 is shown in FIG. 4 as an example turbine engine structure. The rotor blades 18 includes leading and trailing edges 42, 44 and a tip 46 provided by the rotor blade's exterior surface 66, which is indicated by dashed lines in FIG. 4. Numerous passages 48 are provided by the cores 38 which are illustrated in FIG. 3. The passages 48 are defined by various ribs 50 and walls 52.

The rotor blade 18 includes inlets 54 that receives cooling air from a source 55, such as compressor bleed air. Various outlets 58 are provided on the exterior surface and are in communication with the inlets 54 via passages 48.

Figure 5A:
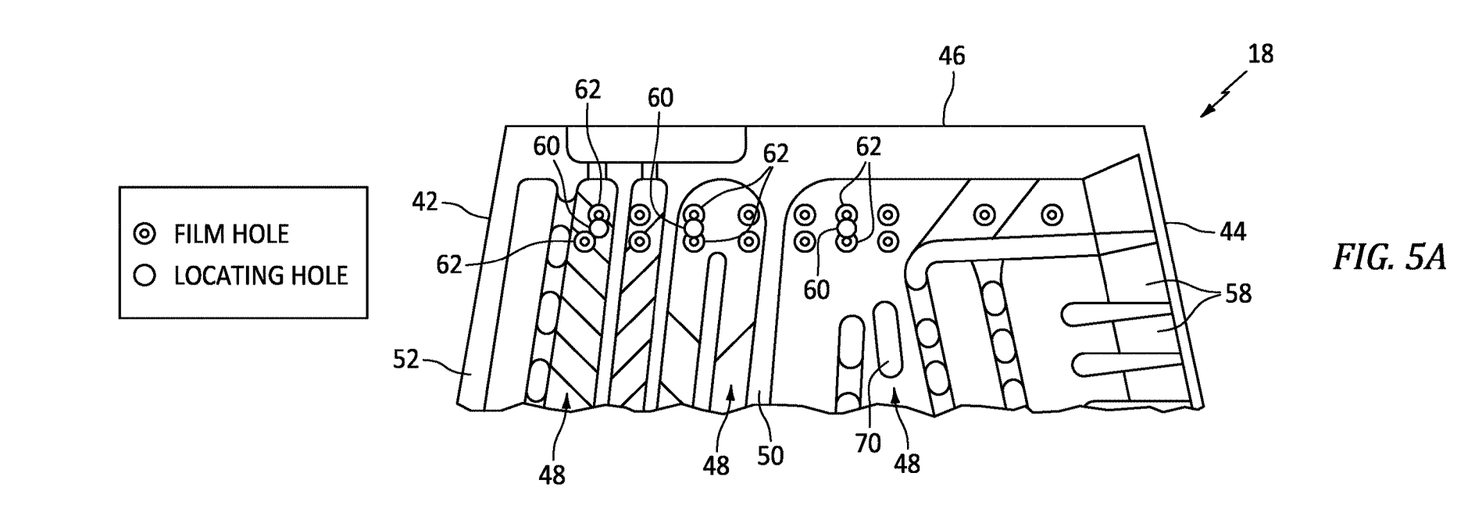
FIG. 5A is an enlarged cross-sectional view of another rotor blade in an area of the tip.

Referring to FIG. 5A, the outlets 58 are provided by film holes 62 arranged in one or more rows 64, some of which may be provided by the locator holes 60. Unlike the prior art, the locator holes 60 (left after removal of the pins 40) intersect or overlap the film holes 62. In this manner, the locator holes 60 are consumed by the film holes and are used to provide fluid from the passages to the film holes 62 to create the boundary layer on the exterior surface 66.

Figure 5B:
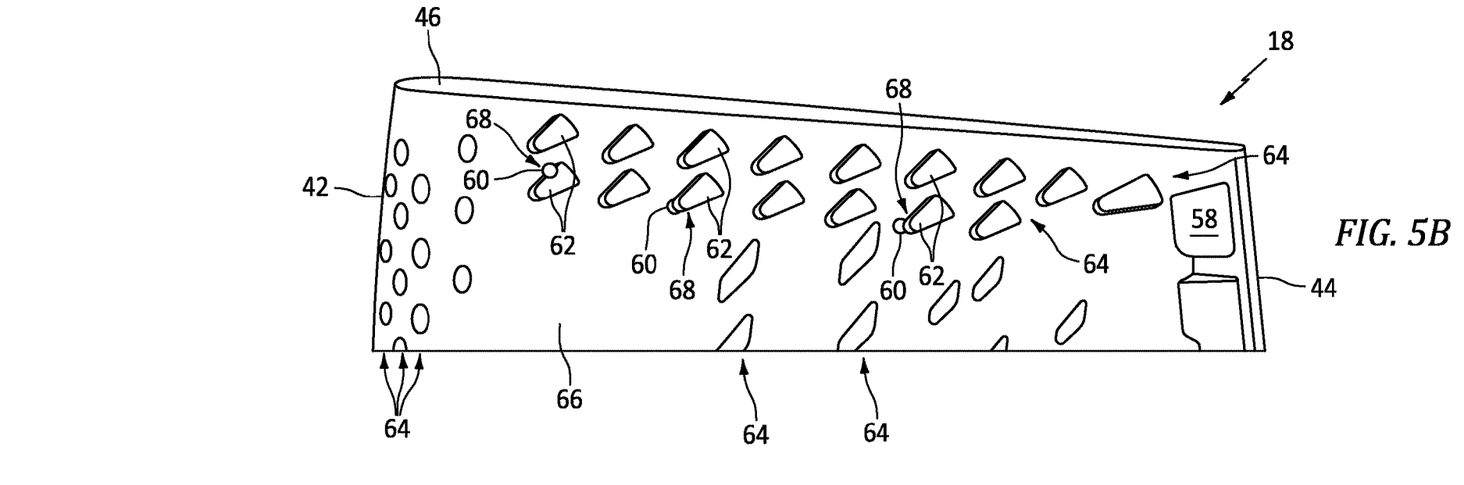
FIG. 5B is a perspective view of an exterior of the rotor blade shown in FIG. 5A.
Figure 6:
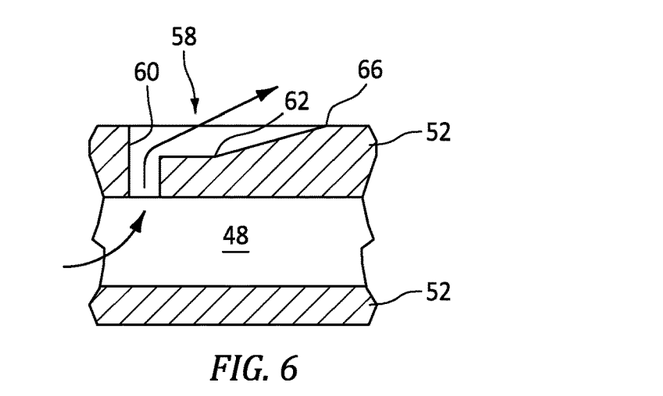
FIG. 6 is a cross-sectional view of a locating hole and film hole according to one example.

Referring to FIGS. 5B and 6, the locator holes 60 are shown in a generally normal angle relative to the exterior surface 66. The film holes 62 are at an acute angle relative to the exterior surface 66 and intersect the locator holes 60. The film holes 62 are typically machined using an electrical discharge machining process, for example. The film holes 62 form a generally frustoconical-shaped recess on the exterior surface 66 (FIG. 5B).

Figure 7:
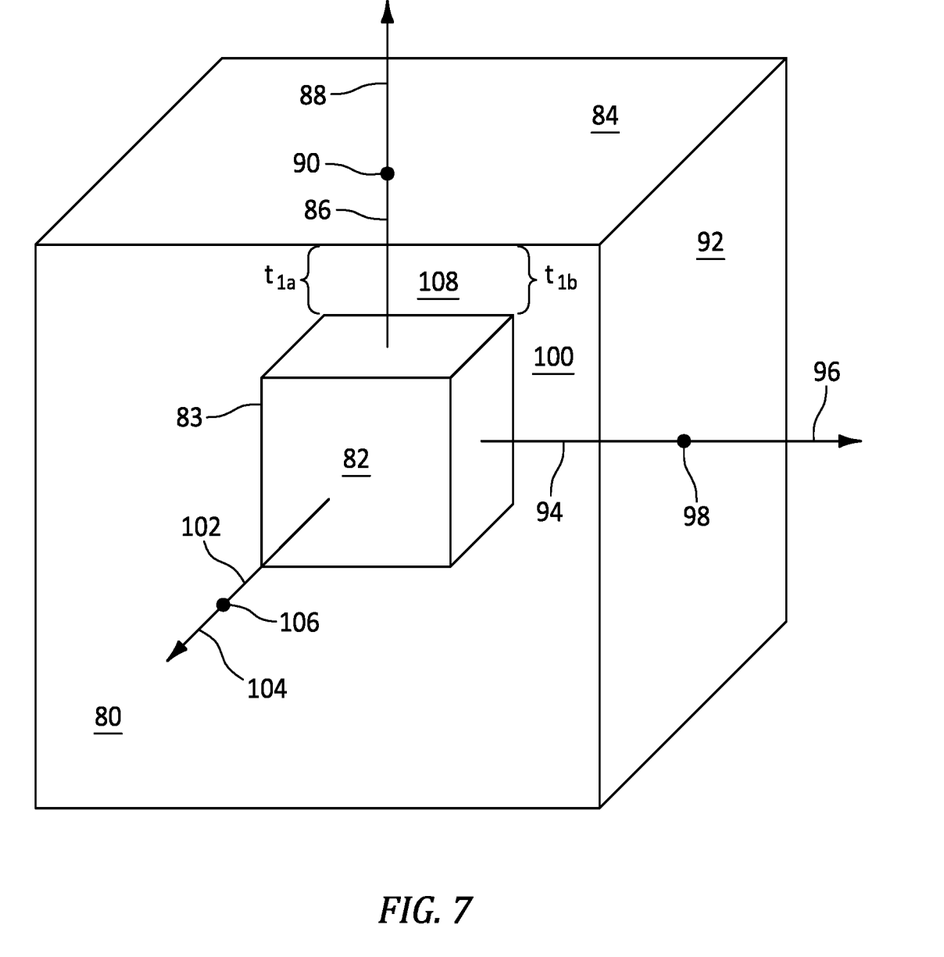
FIG. 7 is a schematic representation of a cavity within a part used to cast a turbine engine structure.
Figure 8:
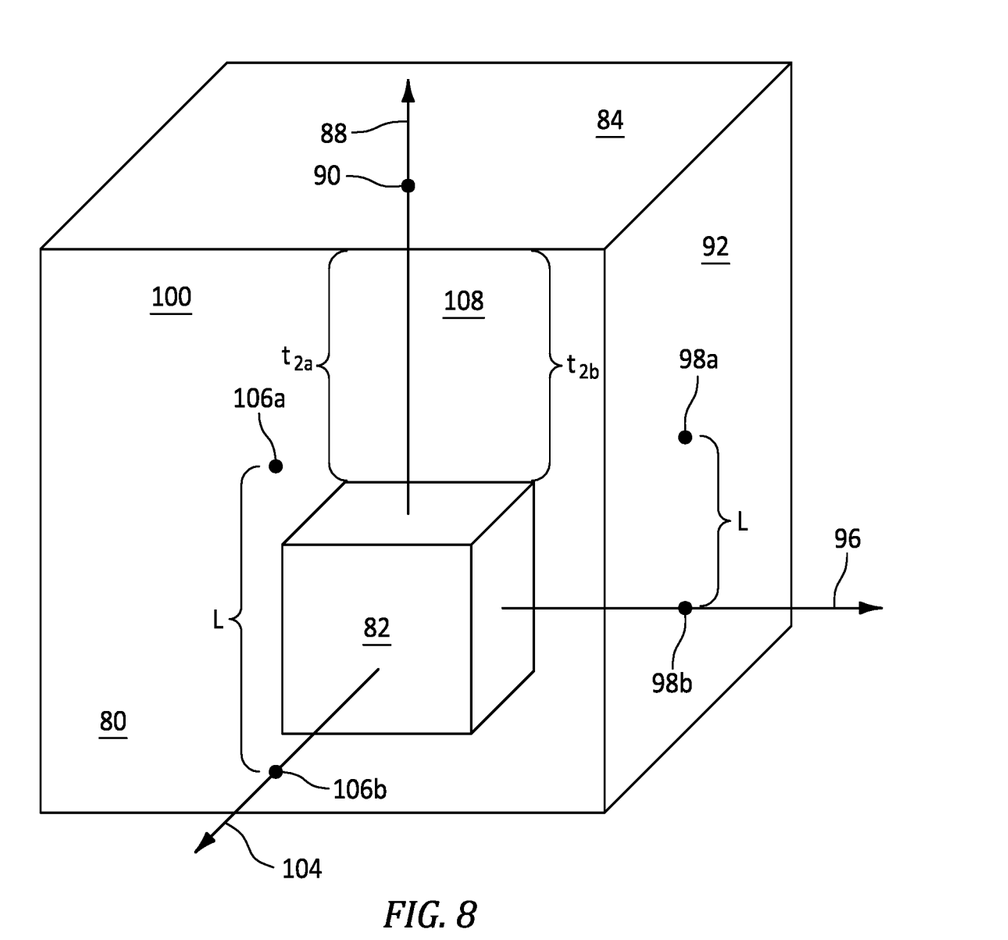
FIG. 8 is a schematic representation of a shifted cavity within a part used to cast a turbine engine structure.
Figure 9:
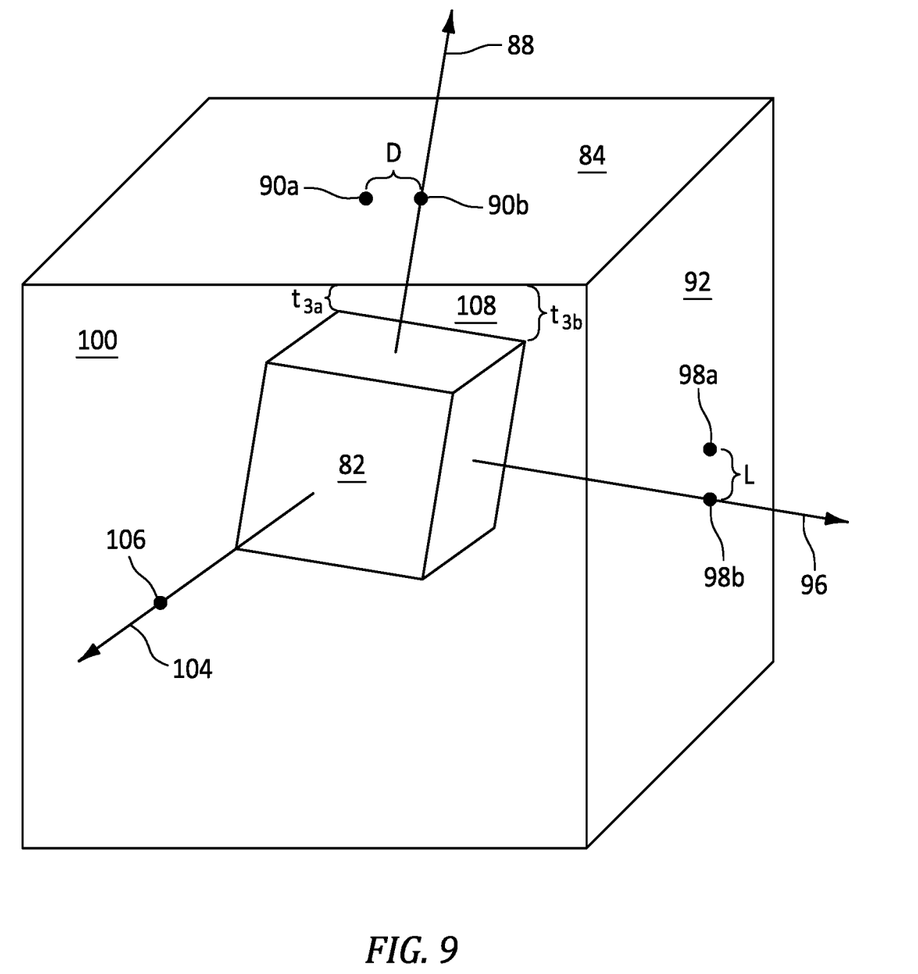
FIG. 9 is a schematic representation of a shifted and rotated cavity within a part used to cast a turbine engine structure.

Referring also to FIG. 7, FIG. 8 and FIG. 9, further details of the disclosure are provided. A part 80 is represented by the large cube shown. The part 80 is hollow with an internal cavity 82 and the part 80 design involves drilling of cooling holes 62 (as seen in FIG. 5A, FIG. 5b and FIG. 6) from the external surface into the internal hidden cavity 82. The part 80 is configured to include the cavity 82, shown as a small cube within the large cube 80. The cavity 82 can represent any of the various voids, such as flow passages 48 that are formed within the part 80, such as those formed after the cores 38 within the mold 28 have been removed after casting, shown in FIG. 3.

The part 80 includes a first exterior surface 84. A first locator 86 can extend the first exterior surface 84 to a core 83, also represented by the small cube within the large cube 80, that creates the cavity 82. The first locator 86 can be similar to the locator pin 40 described above. The first locator 86 can be configured in various shapes such as a conical shape, rod shape, pin shape and the like. The first locator 86 can be employed for core 38 alignment. The first locator 86 can be positioned orthogonal to the first exterior surface 84 and/or the core 83 that forms the cavity 82. A first locator vector 88 is shown extending from the core 83/cavity 82 along a line parallel with the first locator 86. The first locator vector 88 is shown to be normal, that is orthogonal to the first exterior surface 84 as well as (core 83) the cavity 82. However, in exemplary embodiments, the orientation of the first locator 88 can be in any manner provided that the orientation and location are defined.

A first locator hole 90 can be located within the first exterior surface 84 at a location created by the removal of the first locator 86 during casting.

A second exterior surface 92 is located adjacent to the first exterior surface 84. The second exterior surface 92 is shown as being orthogonal to the first exterior surface 84, as a result of the part being shown as a cube. The orientation of the second exterior surface 92 relative to the first exterior surface 84 can vary depending on the shape of the part 80.

A second locator 94 can be positioned as extending from the second exterior surface 92 to the core 83 that creates the cavity 82. The second locator 94 can extend orthogonal to the second exterior surface 92 and core 83 that creates the cavity 82. A second locator vector 96 is shown extending from the second locator 94.

A second locator hole 98 can be located within the second exterior surface 92 at a location created by the second locator 94 being removed during casting.

A third exterior surface 100 can be located adjacent to the first exterior surface 84 and the second exterior surface 92. The third exterior surface 100 can also include an associated third locator 102 having a third locator vector 104. A third hole 106 can be formed in the third exterior surface 100 at a location created by the third locator 102 being removed during casting.

A first cavity wall 108 can be formed between the cavity 82 and the first exterior surface 84. The first cavity wall 108 is shown as having a uniform thickness $t_{1a}$ and $t_{1b}$ where $t_{1a}=t_{1b}$. The part 80 shown in FIG. 7 can be determined to be a nominal part with nominal cavity locations, nominal locator hole locations, nominal locator vectors and nominal wall thickness dimensions.

The nominal attributes of the cavity 82 are determined by the core 83 location. The nominal attributes of the cavity 82 are created during the ceramic core 83 manufacturing step. The ceramic core profile variation will impact the final casting thickness determination and the variation in the placement of the locator rods/pins 86 will impact the final casting location determination. The variation in locator rod/pin 86 location and ceramic core 83 thickness when measured prior to insertion into the wax die can be factored into the final location and thickness determination by offsetting the actual measured values from the nominal values.

Referring also to FIG. 8, the cavity 82 is shown in a new location, an actual location after casting. The cavity 82 is shown with a shift from the nominal location to an actual location within the part 80. The cavity 82 can be seen to shift away from first exterior surface 84. The first cavity wall thicknesses have changed to become first cavity wall thickness tea and first cavity wall thickness tab. The first cavity wall thickness has changed by a value of L distance. It can be seen that the location of the second locator hole 98a and third locator hole 106a have shifted to a subsequent second locator hole 98b and third locator hole 106b reflecting the change of location of the cavity 82 relative to the first exterior surface 84 the distance of L. The first locator hole 90, second locator hole 98a and third locator hole 106a represent a nominal location for the first locator 86, second locator 94 and third locator 102 respectively.

The actual position of the cavity 82, after casting, can be demonstrated by the first locator hole 90, the second locator hole 98b and the third locator hole 106b. The distance L represents the magnitude of the shift from the nominal position along a single axis of translation.

By understanding the relative positions of the first locator hole 90, the second locator hole 98b and third locator hole 102, a calculation of position of the hidden cavity 82 can be performed to determine the actual location of the cavity 82. In addition to the relative changes of the cavity 82 to the first exterior surface 84, it is understood that any changes in position relative to the second exterior surface 92 and/or third exterior surface 100 provide input to determining the actual location of the cavity 82 after casting.

Referring also to FIG. 9, the cavity 82 is shown with an altered actual orientation relative to the nominal orientation shown in FIG. 7. FIG. 7 and FIG. 9 depictions demonstrate the shifting of the core 83 during casting resulting in a shift of the cavity 82 from a nominal position and orientation shown at FIG. 7 to an actual position and orientation shown at FIG. 9. The cavity 82 has been reoriented, rotated about an axis aligned with the third locator vector 104. As a result of the rotation of the cavity 82, the location of the first locator hole 90 shifted from the nominal first locator hole 90a to the actual first locator hole 90b. A distance D indicates the length of the shift of the first locator hole 90. As a result of the rotation of the cavity 82, the location of the second locator hole 98 shifted from the nominal second locator hole 98a to the actual second locator hole 98b a distance L.

The first cavity wall 108 no longer has a uniform thickness. The first cavity wall 108 can be seen with a thickness ta and a different thickness $t_{3b}$. The thickness $t_{3a}$ is less than the thickness $t_{3b}$. The actual position and orientation of the cavity 82 can vary from the nominal location and include a shift from the nominal location and orientation due to translation along and/or rotation about one or more of the primary axes defining the part and feature locations.

The locator holes 90, 98, 106 are created by the locators 86, 94, 102 used for core alignment attached to the core 83 that produces the internal cavity 82. The relationship of these holes 90, 98, 106 relative to each other and to the external part datums (such as the exterior surfaces 84, 92, 100) allows for determining the location and orientation of the internal cavities 82. By understanding the deviations in the X, Y, and Z locations/orientations of each hole 90, 98, 106 one can determine the location and orientation of each cavity 82 and further be able to estimate wall thickness at the point of drilling.

By understanding the dimensional locations/orientations of the nominal part and the actual part of the first locator hole 88, second locator hole 98 and third locator hole 106 as well as the wall thickness of the first cavity wall 108 and any other cavity wall, one can determine the actual post casting location and orientation of the cavity 82 and then determine placement of the location of any film holes 62.

Figure 10:
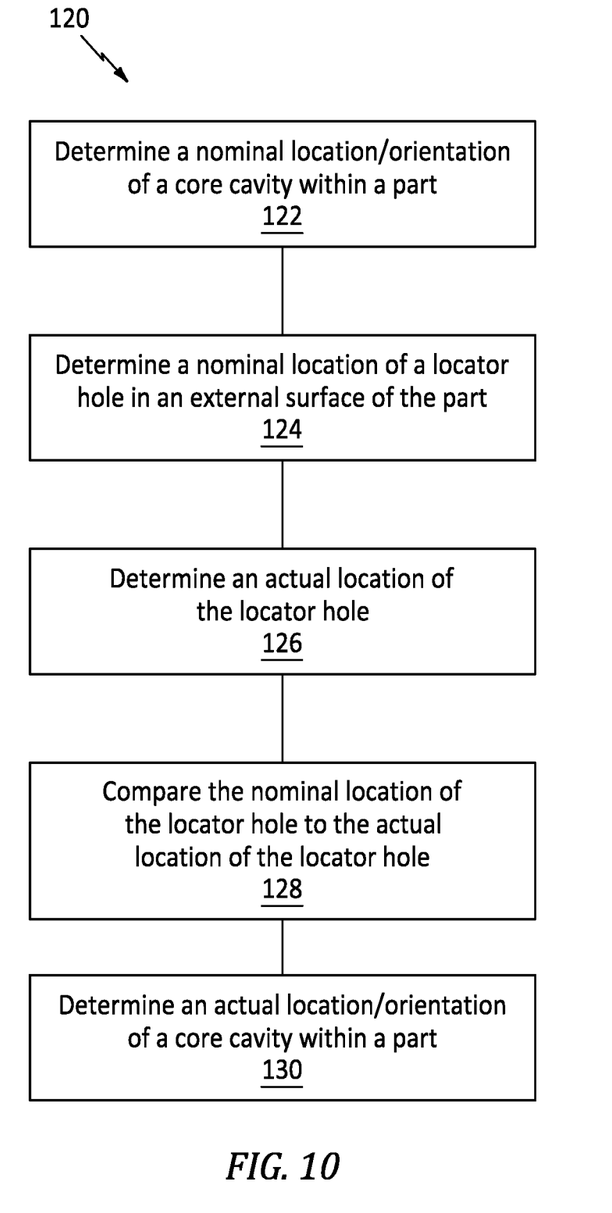
FIG. 10 is a process map of an exemplary process.

Referring to FIG. 10 a process map is shown. The process 120 includes various steps for determining a location/orientation of a core cavity in a cast part. The step 122 includes determining a nominal location/orientation of the core cavity within the part. The step 124 includes determining a nominal location of a locator hole in an external surface of the part. Step 126 includes determining an actual location of the locator hole in the external surface of the part. The step 128 includes comparing the nominal location of the locator hole in the external surface of the part to the actual location of the locator hole in the external surface of the part. The step 130 includes determining an actual location/orientation of the core cavity within the part.

A technical advantage of the disclosed process can include describing both the location and orientation of the internal cavity information critical to drilling of the cooling holes more precisely.

Another technical advantage of the disclosed process can include the capacity to determine critical dimensions such as wall thickness, rib location, and the like.

There has been provided a process of determining a location and an orientation of an internal core cavity for a casting. While the process of determining a location and an orientation of an internal core cavity for a casting has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of determining an actual location and orientation of a core cavity in a cast part comprising:
   determining a nominal location and orientation of the core cavity within the cast part;
   determining a nominal location of at least one locator hole in at least one external surface of the cast part; the at least one locator hole being formed responsive to at least one locator positioned between a core and the at least one external surface;

determining an actual location of the at least one locator hole in the at least one external surface of the cast part; the at least one locator hole being formed responsive to removal of the at least one locator;

comparing the nominal location of the at least one locator hole in the at least one external surface of the cast part to the actual location of the at least one locator hole in the at least one external surface of the cast part; and determining an actual location and orientation of the core cavity within the cast part, the core cavity being formed after casting of the cast part by the removal of a core during casting of the cast part.

2. The process according to claim 1, further comprising:
determining a nominal location of a first locator hole in a first external surface of the cast part, the first locator hole being formed responsive to a first locator positioned between a core and the first external surface;

determining an actual location of the first locator hole in the first external surface of the cast part, the first locator hole being formed responsive to removal of the first locator; and comparing the nominal location of the first locator hole in the first external surface to the actual location of the first locator hole in the first external surface.

3. The process according to claim 2, further comprising:
determining a nominal first wall thickness between the core and the first exterior surface; and
determining an actual first wall thickness between the core cavity and the first exterior surface.

4. The process according to claim 1, further comprising:
determining a nominal location of a second locator hole in a second external surface of the part, the second locator hole being formed responsive to a second locator positioned between a core and the second external surface;

determining an actual location of the second locator hole in the second external surface of the cast part, the second locator hole being formed responsive to removal of the second locator; and comparing the nominal location of the second locator hole in the second external surface to the actual location of the second locator hole in the second external surface.

5. The process according to claim 1, further comprising:
determining a nominal second wall thickness between the core and the second exterior surface; and
determining an actual second wall thickness between the core cavity and the second exterior surface.

6. The process according to claim 1, further comprising:
determining a nominal location of a third locator hole in a third external surface of the cast part, the third locator hole being formed responsive to a third locator positioned between a core and the third external surface;

determining an actual location of the third locator hole in the third external surface of the cast part, the third locator hole being formed responsive to removal of the third locator; and comparing the nominal location of the third locator hole in the third external surface to the actual location of the third locator hole in the third external surface.

7. The process according to claim 1, further comprising:
determining a nominal third wall thickness between the core and the third exterior surface; and
determining an actual third wall thickness between the core cavity and the third exterior surface.

8. A process of determining an actual location and orientation of a cavity in a cast part for a gas turbine engine comprising:

determining a nominal location and orientation of the cavity within the cast part responsive to a nominal location of a core configured to form the cavity;

determining a nominal location of at least one locator hole in at least one external surface of the cast part;

determining an actual location of at least one locator hole responsive to removal of at least one locator in the at least one external surface of the cast part;

comparing the nominal location of the at least one locator hole in the at least one external surface of the cast part to the actual location of the at least one locator hole in the at least one external surface of the cast part; and determining an actual location and orientation of the cavity within the cast part, the cavity being formed after casting of the cast part by the removal of a core during casting of the cast part.

9. The process according to claim 8, wherein comparing the nominal location of the at least one locator hole in the at least one external surface of the cast part to the actual location of the at least one locator hole in the at least one external surface of the cast part further comprises determining a distance between the nominal location of the at least one locator hole and the actual location of the at least one locator hole.

10. The process according to claim 9, further comprising:
determining a nominal first wall thickness between the core and the first exterior surface; and
determining an actual first wall thickness between the cavity and the first exterior surface.

11. The process according to claim 10, further comprising:
comparing the nominal first wall thickness to the actual first wall thickness.

12. The process according to claim 10, further comprising:
determining multiple nominal first wall thicknesses between the core and the first exterior surface;
determining multiple actual first wall thicknesses between the cavity and the first exterior surface;
comparing the multiple nominal first wall thicknesses to the multiple actual first wall thicknesses; and
identifying any differences between the multiple nominal first wall thicknesses to the multiple actual first wall thicknesses.

13. The process according to claim 8, wherein the cast part is selected from the group consisting of a rotor blade, a guide vane, a stator vanes and a blade outer air seal.

14. A process of determining an actual location and orientation of a cavity in a cast part for a gas turbine engine comprising:

determining a nominal location and orientation of a core configured to form the cavity;

determining a nominal location of at least one locator in at least one external surface of the cast part;

determining an actual location of at least one locator hole responsive to removal of the at least one locator in the at least one external surface of the cast part;

comparing the nominal location of the at least one locator in the at least one external surface of the cast part to the actual location of the at least one locator hole in the at least one external surface of the cast part;

determining an actual location of the cavity within the cast part; and determining an actual orientation of the cavity within the cast part, the cavity being formed after casting of the cast part by the removal of a core during casting of the cast part.

15. The process of claim 14, further comprising:
determining a nominal location of a first locator hole in a first external surface of the cast part, the first locator hole being formed responsive to the first locator positioned between the core and the first external surface;
determining an actual location of the first locator hole in the first external surface of the cast part, the first locator hole being formed responsive to removal of the first locator; and
comparing the nominal location of the first locator hole in the first external surface to the actual location of the first locator hole in the first external surface.

16. The process of claim 14, further comprising:
determining a nominal first wall thickness between the core and the first exterior surface; and
determining an actual first wall thickness between the cavity and the first exterior surface.

17. The process of claim 14, further comprising:
determining a nominal location of a second locator hole in a second external surface of the cast part, the second locator hole being formed responsive to a second locator positioned between the core and the second external surface;
determining an actual location of the second locator hole in the second external surface of the cast part, the second locator hole being formed responsive to removal of the second locator; and
comparing the nominal location of the second locator hole in the second external surface to the actual location of the second locator hole in the second external surface.

18. The process of claim 14, further comprising:
determining a nominal second wall thickness between the core and the second exterior surface; and
determining an actual second wall thickness between the cavity and the second exterior surface.

19. The process of claim 14, further comprising:
determining a nominal location of a third locator hole in a third external surface of the cast part, the third locator hole being formed responsive to a third locator positioned between the core and the third external surface;
determining an actual location of the third locator hole in a third external surface of the cast part, the third locator hole being formed responsive to removal of the third locator; and
comparing the nominal location of the third locator hole in the third external surface to the actual location of the third locator hole in the third external surface.

20. The process of claim 14, further comprising:
determining a nominal third wall thickness between the core and the third exterior surface; and
determining an actual third wall thickness between the cavity and the third exterior surface.

* * * * *